(12) United States Patent
Royston et al.

(10) Patent No.: US 8,867,990 B2
(45) Date of Patent: Oct. 21, 2014

(54) DETECTING A PRESENCE OF NEAR FIELD COMMUNICATIONS (NFC) DEVICES

(75) Inventors: Philip Stewart Royston, Berkshire (GB); Steven Deane Hall, Olivenhain, CA (US)

(73) Assignee: Broadcom Corporation, Irvine, CA (US)

( * ) Notice: Subject to any disclaimer, the term of this patent is extended or adjusted under 35 U.S.C. 154(b) by 109 days.

(21) Appl. No.: 13/408,149

(22) Filed: Feb. 29, 2012

(65) Prior Publication Data

US 2013/0225071 A1   Aug. 29, 2013

(51) Int. Cl.
*H04B 5/00*   (2006.01)

(52) U.S. Cl.
USPC ....... 455/41.1; 340/10.1; 340/572.4; 235/492

(58) Field of Classification Search
CPC ..... H04W 4/008; H04W 12/06; H04W 12/08; H04B 5/0025; H04B 5/0075
USPC .............. 455/41.1, 41.2, 130, 572, 573, 558; 340/10.1, 10.2, 572.4, 825.71; 235/492
See application file for complete search history.

(56) References Cited

U.S. PATENT DOCUMENTS

| | | | |
|---|---|---|---|
| 6,905,074 B2 * | 6/2005 | Charrat ........................ | 235/492 |
| 6,972,662 B1 | 12/2005 | Ohkawa et al. | |
| 6,982,645 B2 * | 1/2006 | Ricci ............................ | 340/572.1 |
| 7,245,222 B2 * | 7/2007 | Bierach ........................ | 340/572.4 |
| 7,412,224 B2 * | 8/2008 | Kotola et al. ................ | 455/403 |
| 7,522,878 B2 | 4/2009 | Baarman | |
| 7,598,872 B2 * | 10/2009 | Pluss et al. .................. | 340/572.4 |
| 7,720,438 B2 * | 5/2010 | Rowse .......................... | 455/41.1 |
| 7,782,209 B2 * | 8/2010 | Lowe et al. .................. | 340/572.4 |
| 7,889,057 B2 * | 2/2011 | Seon ............................ | 340/10.2 |
| 7,986,916 B2 * | 7/2011 | Williams ...................... | 455/41.1 |
| 8,014,721 B2 * | 9/2011 | Johnson ........................ | 455/41.1 |
| 8,063,746 B2 * | 11/2011 | Borcherding ................ | 340/10.34 |
| 8,116,679 B2 * | 2/2012 | Dunko .......................... | 455/41.1 |
| 8,140,010 B2 * | 3/2012 | Symons et al. .............. | 455/41.1 |
| 8,150,321 B2 * | 4/2012 | Winter et al. ................ | 455/41.2 |

(Continued)

FOREIGN PATENT DOCUMENTS

| | | |
|---|---|---|
| CN | 1620667 A | 5/2005 |
| CN | 101951281 A | 1/2011 |

(Continued)

OTHER PUBLICATIONS

European Search Report for EP Patent Application No. EP13000555. 6, European Patent Office, Munich, Germany, mailed on Jul. 10, 2013

(Continued)

*Primary Examiner* — Marceau Milord
(74) *Attorney, Agent, or Firm* — Sterne, Kessler, Goldstein & Fox P.L.L.C.

(57) ABSTRACT

A near field communications (NFC) device is disclosed that detects a presence of another NFC capable device within its magnetic field. The NFC device generates an unmodulated frequency varying detection sequence to generate a frequency varying magnetic field and/or a modulated frequency invariant detection sequence to generate a carrier-frequency invariant magnetic field. The NFC device samples these magnetic fields and compares these samples to various a priori known responses of various objects to determine whether another NFC device is present within the frequency varying magnetic field and/or the carrier-frequency invariant magnetic field.

18 Claims, 11 Drawing Sheets

(56) References Cited

U.S. PATENT DOCUMENTS

| | | | |
|---|---|---|---|
| 8,203,429 B2* | 6/2012 | Borcherding | 340/10.1 |
| 8,271,662 B1* | 9/2012 | Gossweiler et al. | 709/227 |
| 8,319,612 B2* | 11/2012 | Borcherding | 340/10.34 |
| 8,326,224 B2* | 12/2012 | Butler | 455/41.1 |
| 8,358,596 B2* | 1/2013 | Byrne et al. | 370/255 |
| 8,422,946 B2* | 4/2013 | Bangs et al. | 455/41.1 |
| 8,432,293 B2* | 4/2013 | Symons | 340/854.8 |
| 8,489,020 B2* | 7/2013 | Bangs et al. | 455/41.1 |
| 8,538,332 B2* | 9/2013 | Huomo et al. | 455/41.2 |
| 2004/0113755 A1 | 6/2004 | Ricci | |
| 2005/0077356 A1 | 4/2005 | Takayama et al. | |
| 2006/0170553 A1 | 8/2006 | Bierach | |
| 2007/0001816 A1 | 1/2007 | Lindley et al. | |
| 2007/0188326 A1 | 8/2007 | Pluss et al. | |
| 2007/0229273 A1 | 10/2007 | Hoemann et al. | |
| 2007/0236336 A1 | 10/2007 | Borcherding | |
| 2008/0180248 A1 | 7/2008 | Lian et al. | |
| 2010/0015917 A1 | 1/2010 | Symons et al. | |
| 2010/0124252 A1 | 5/2010 | Shin et al. | |
| 2010/0204563 A1 | 8/2010 | Stodilka et al. | |
| 2010/0301855 A1 | 12/2010 | Hyde et al. | |
| 2011/0007936 A1 | 1/2011 | Rhoads | |
| 2012/0329391 A1 | 12/2012 | Hall et al. | |
| 2013/0143488 A1 | 6/2013 | Royston et al. | |

FOREIGN PATENT DOCUMENTS

| | | |
|---|---|---|
| EP | 1 394 720 A2 | 3/2004 |
| EP | 2 538 571 A1 | 12/2012 |
| KR | 10-2005-0105200 A | 11/2005 |
| KR | 10-0526732 B1 | 11/2005 |
| KR | 10-2010-0016754 A | 2/2010 |
| WO | WO 2006/076669 A1 | 7/2006 |

OTHER PUBLICATIONS

International Standard: ISO/IEC 21481, *Information technology—Telecommunications and information exchange between systems—Near Field Communication Interface and Protocol-2 (NFCIP-2)*, pp. 1-12, First edition, Reference No. ISO/IEC 21481:2005(E), ISO/IEC (Jan. 2005).

International Standard: ISO/IEC 18092, *Information technology—Telecommunications and information exchange between systems—Near Field Communication—Interface and Protocol (NFCIP-1)*, pp. 1-66, First edition, Reference No. ISO/IEC 18092:2004(E), ISO/IEC (Apr. 2004).

*NFC Activity Specification, Activity 1.0, NFCForum-TS-Activity-1.0*, NFC Forum, Inc., Entire document (117 pages), Nov. 18, 2010.

European Search Report for EP Patent Application No. EP 12004639.6, European Patent Office, Munich, Germany, mailed on. Sep. 25, 2012; 3 pages.

European Search Report for EP Patent Application No. EP12006692.3, European Patent Office, Munich, Germany, mailed on. Sep. 25, 2012; 3 pages.

English language abstract of KR 10-2010-001674 A, Thomson Innovation, http://www.thomsoninnovation.com, accessed Nov. 11, 2013; 6 pages.

Communication from the Examining Division of the European Patent Office for EP Patent Application No. EP 12004639.6, mailed Oct. 12, 2012; 5 pages.

Communication from the Examining Division of the European Patent Office for EP Patent Application No. EP 12006692.3, mailed Mar. 21, 2013; 5 pages.

Communication from the Examining Division of the European Patent Office for EP Patent Application No. EP 13000555.6, mailed Jul. 22, 2013; 5 pages.

Office Action for Korean Patent Application No. 10-2013-0021281, mailed on Apr. 28, 2014; 5 pages.

Office Action directed to related Chinese Patent Application No. 201210211814, mailed Mar. 11, 2014; 6 pages.

Office Action directed to related Taiwanese Patent Application No. 101133683, mailed Apr. 11, 2014; 7 pages.

Office Action directed to related Taiwanese Patent Application No. 102106913, mailed Aug. 11, 2014; 8 pages.

* cited by examiner

DETECTING A PRESENCE OF NEAR FIELD COMMUNICATIONS (NFC) DEVICES

BACKGROUND

1. Field of Disclosure

The disclosure relates to near field communications (NFC), and more specifically to detecting a presence of a NFC capable device.

2. Related Art

Near field communication (NFC) devices are being integrated into mobile devices, such as smartphones for example, to facilitate the use of these mobile devices in conducting daily transactions. For example, instead of carrying numerous credit cards, the credit information provided by these credit cards can be loaded into a NFC device and stored therein to be used as needed. The NFC device is simply tapped to a credit card terminal to relay the credit information to it to complete a transaction. As another example, a ticket writing system, such as those used in bus and train terminals, may simply write ticket fare information onto the NFC device instead of providing a paper ticket to a passenger. The passenger simply taps the NFC device to a reader to ride the bus or the train without the use of the paper ticket.

Generally, NFC includes a polling mode of operation to establish a communication among NFC devices. A first conventional approach probes a magnetic field of a first conventional NFC device for a second NFC device in accordance with a predefined polling routine. In this first conventional approach, the first conventional NFC device generates the magnetic field without any information for a predetermined duration, typically referred to as a guard time, that is technology dependent. The first conventional NFC device then probes the magnetic field for a second NFC device of a first technology type, such as type A, type B, or type F to provide some examples, using a conventional polling command upon expiration of the guard time. The conventional polling command includes such a conventional request command, type A (REQA), a conventional request command, type B (REQB), or a conventional request command, type F (REQF). The first conventional NFC device then generates the magnetic field without any information for another guard time and probes the magnetic field for a second NFC device of a second technology type using the conventional polling command if no response is received from the second conventional NFC device. The first conventional approach is further described in "NFC Forum: NFC Activity Specification: Technical Specification, NFC Forum™ Activity 1.0 NFCForum-TS-Activity-1.0," published Nov. 18, 2010, which is incorporated by reference herein in its entirety. Other technologies can also be polled for such as (but not limited) to ISO15693 vicinity cards to provide an example.

The guard time of the first conventional approach unnecessarily consumes power=. Typically, the guard time is approximately 5 ms when probing for type A and type B NFC devices and may reach more than 20 ms when probing for type F NFC devices. Additionally, the first conventional NFC device may have to generate the magnetic field without any information for more than one guard time and probe the magnetic field using more than one polling command for certain technologies. For example, the first conventional approach typically polls for type A devices then for type B devices which is followed by type F devices. In this example, the first conventional NFC device generates the guard time for type A, B, and F devices and provides the REQA, REQB, and REQF commands to establish a communication with a type F NFC device.

A second conventional approach transmits detection pulses having substantially similar magnitudes to detect a presence of NFC devices. A first NFC device continuously provides the detection pulses until a change in the magnitude one of the detection pulses is detected. This change is indicative of a second NFC device being present within a magnetic field of the first NFC device. The second conventional approach is further described in U.S. patent application Ser. No. 12/446,591, filed on Apr. 22, 2009 under 35 U.S.C. §371 (c), which is incorporated herein by reference in its entirety.

However, this simple detection of pulse change is susceptible to changes in environment. For example, moving the first NFC device around the environment may cause the magnitudes of the one or more detection pulses to change. As another example, objects within the environment, such as metal objects or other non-NFC capable devices to provide some examples, entering into the magnetic field may cause the magnitudes of the one or more detection pulses to change. These changes may result from changes in the environment alone and, not from the second NFC becoming present within the magnetic field. Consequentially, the first NFC device may improperly determine that the second NFC device is present.

Thus, there is a need to detect a presence of another NFC device within a magnetic field that overcomes the shortcomings described above. Further aspects and advantages of the present disclosure will become apparent from the detailed description that follows.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 3A:
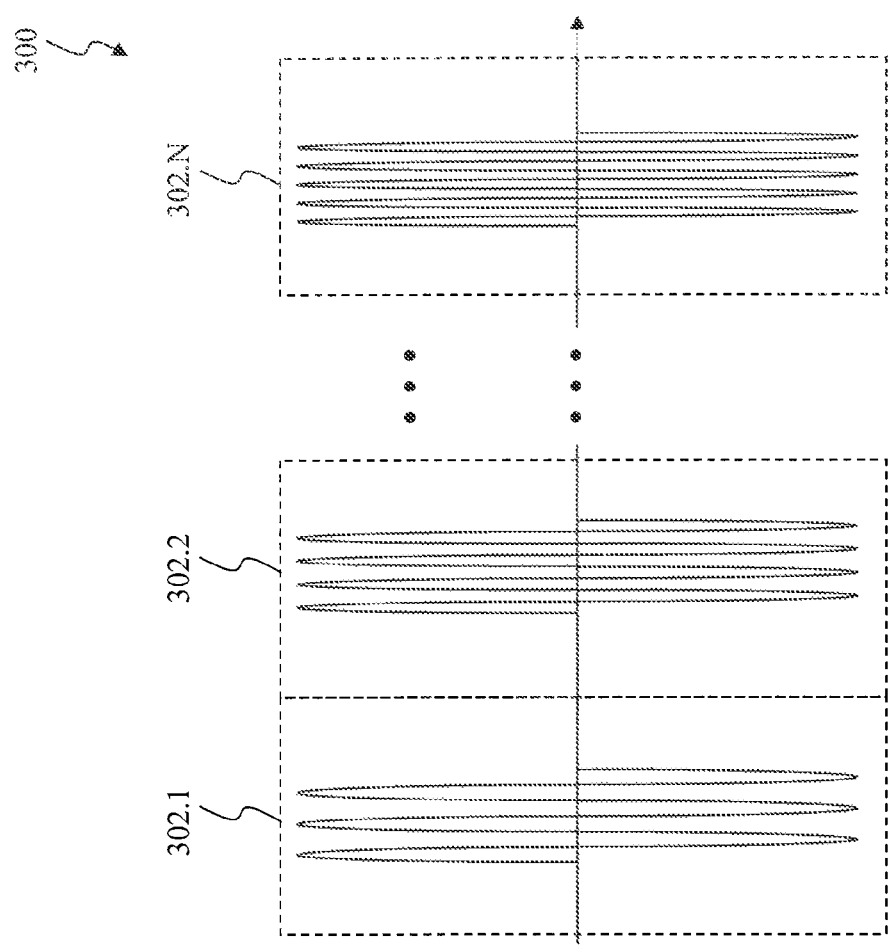
Figure 3B:
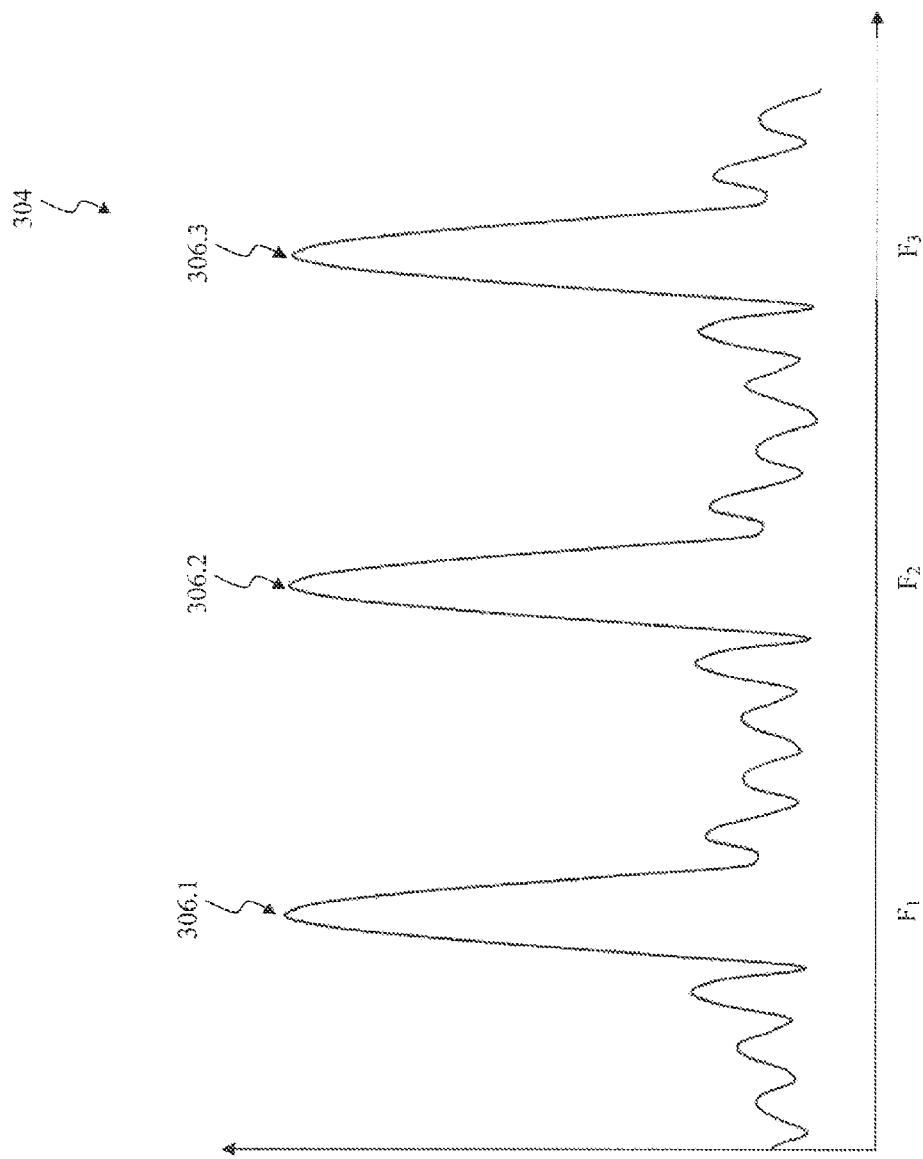
Figure 4A:
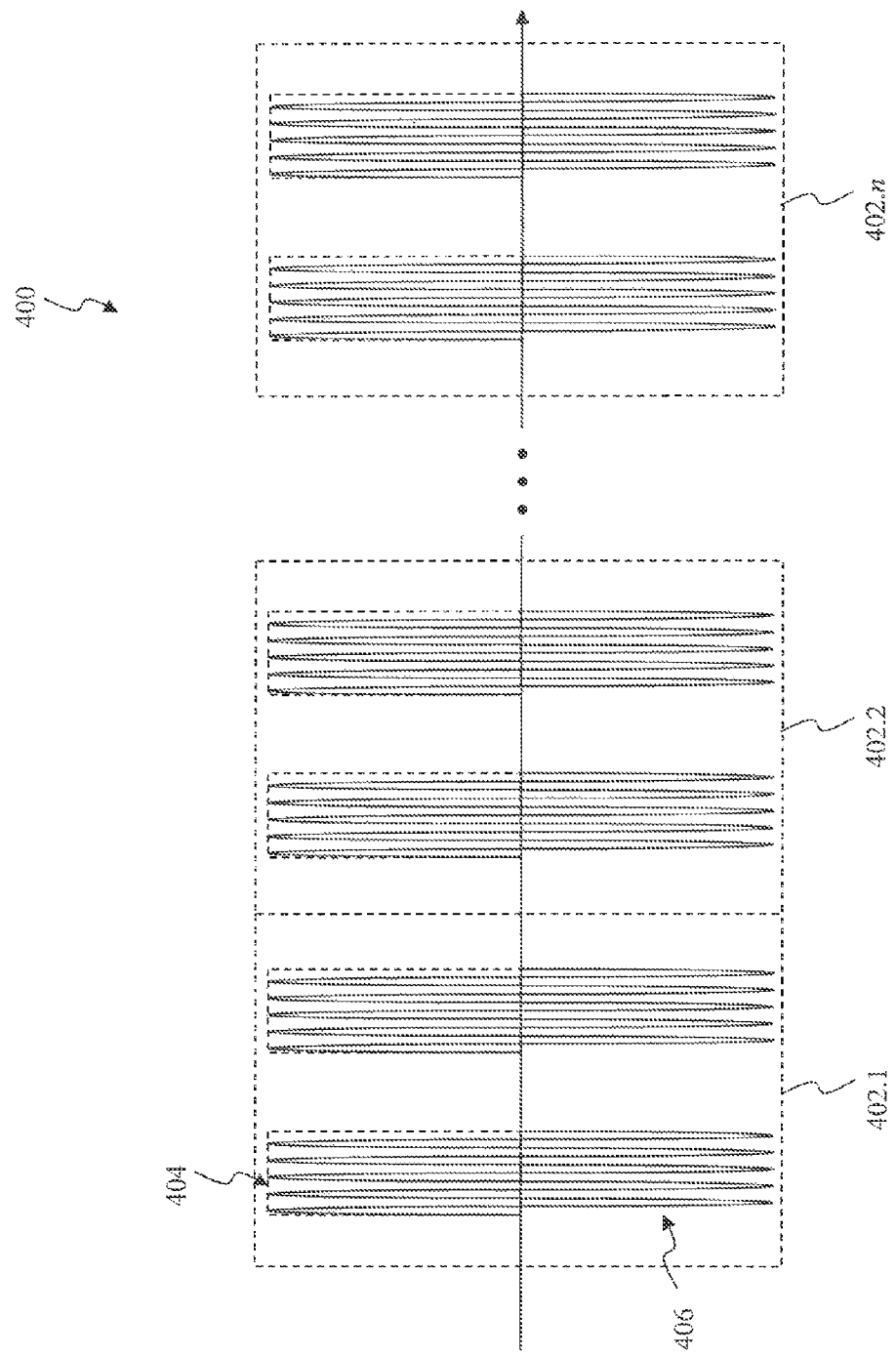
Figure 4B:
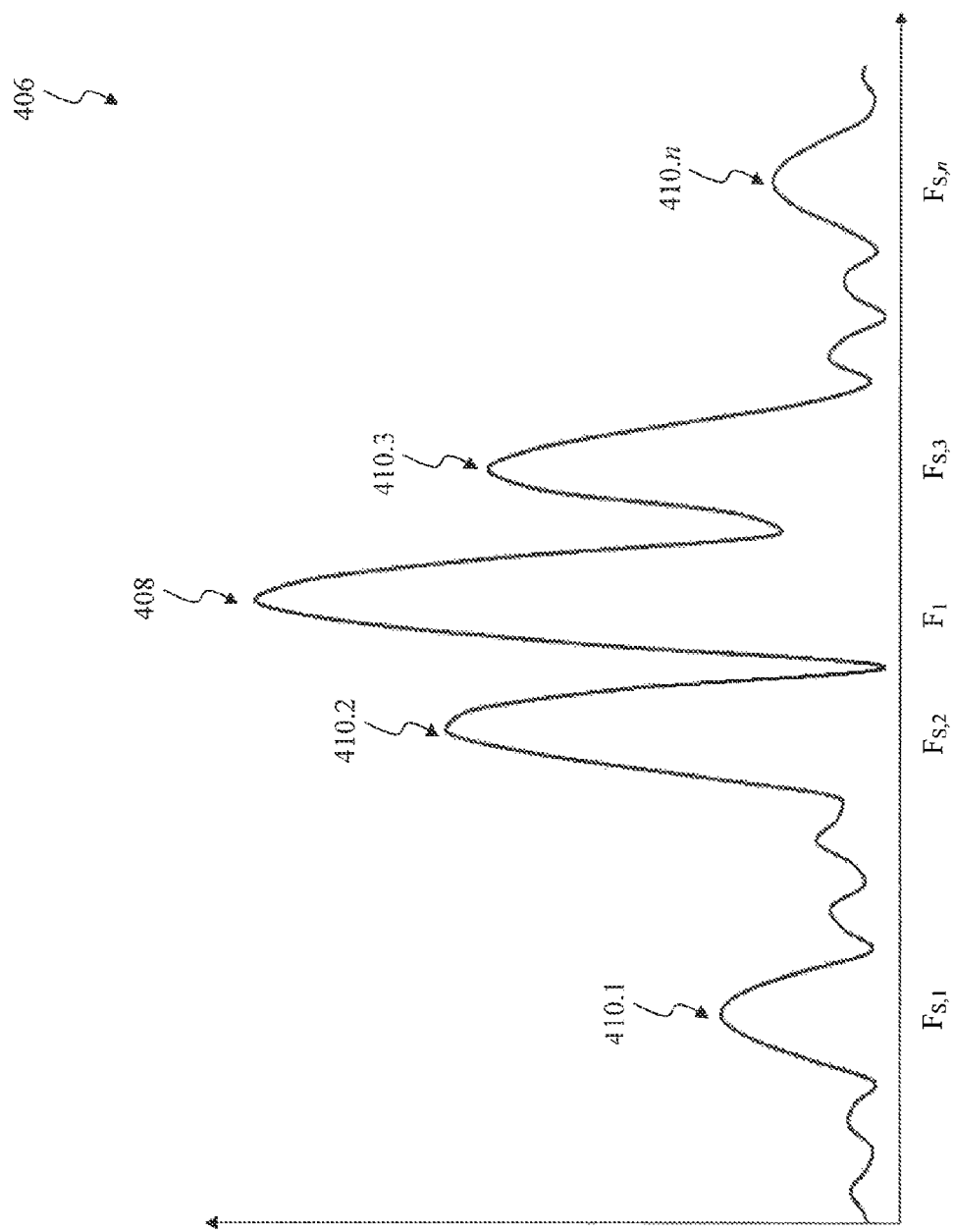
Figure 5:
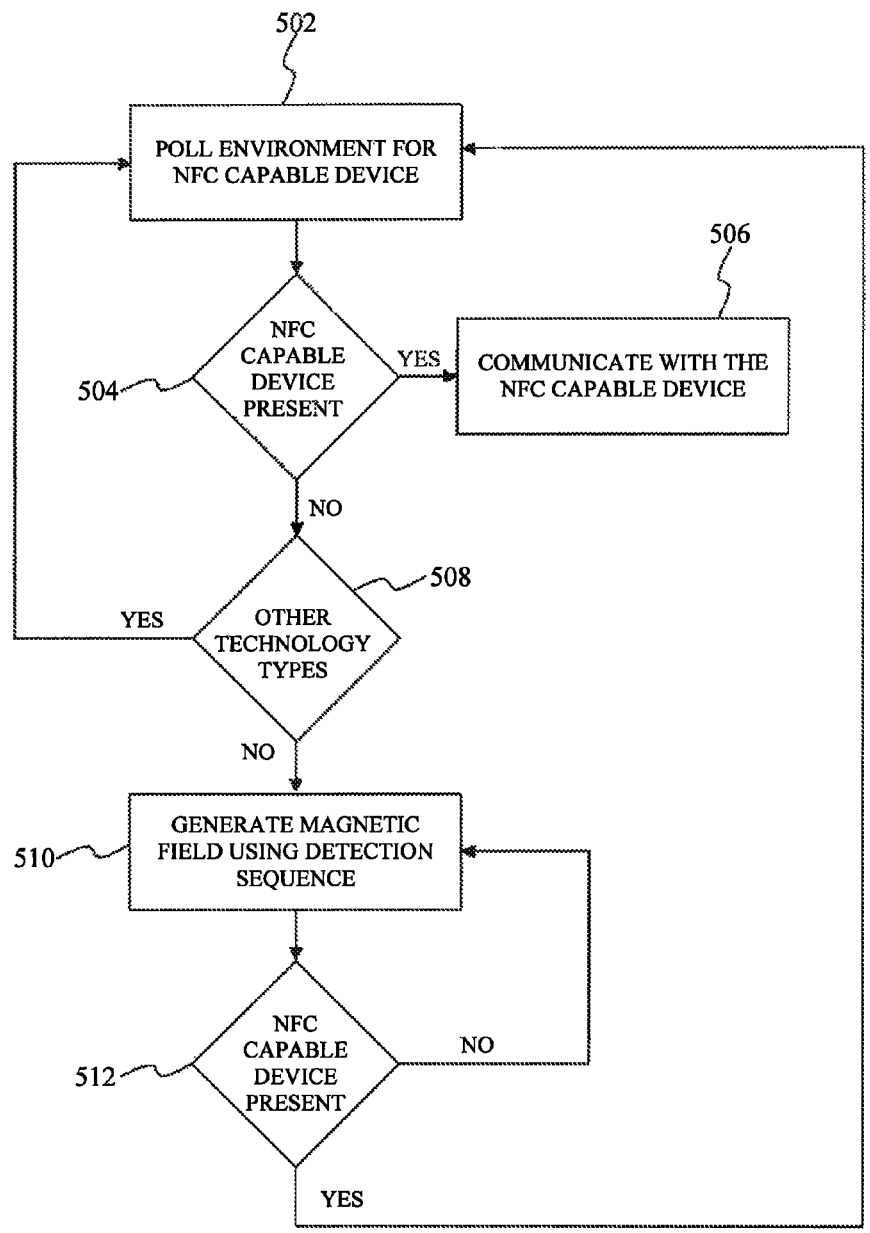
Figure 6A:
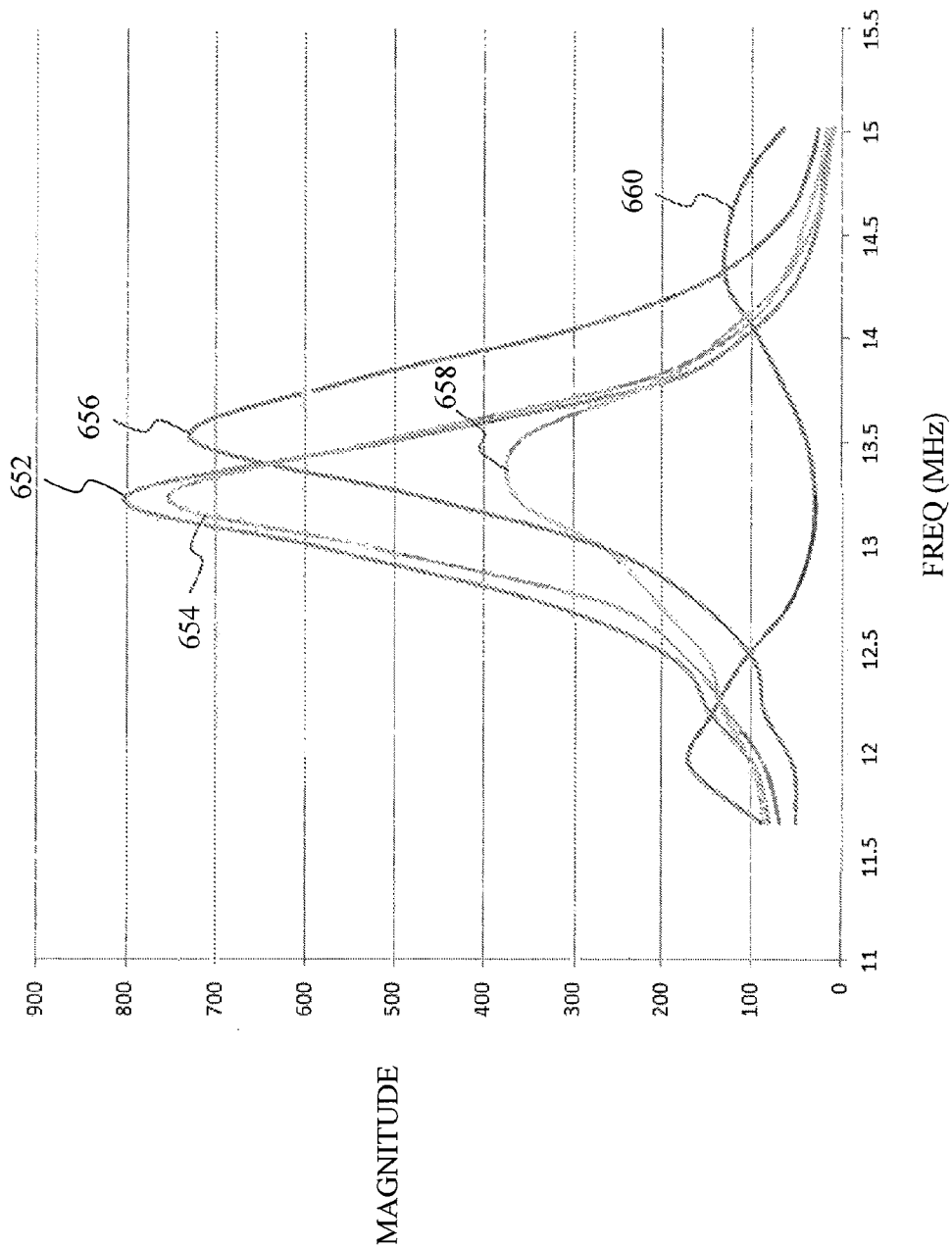
Figure 6B:
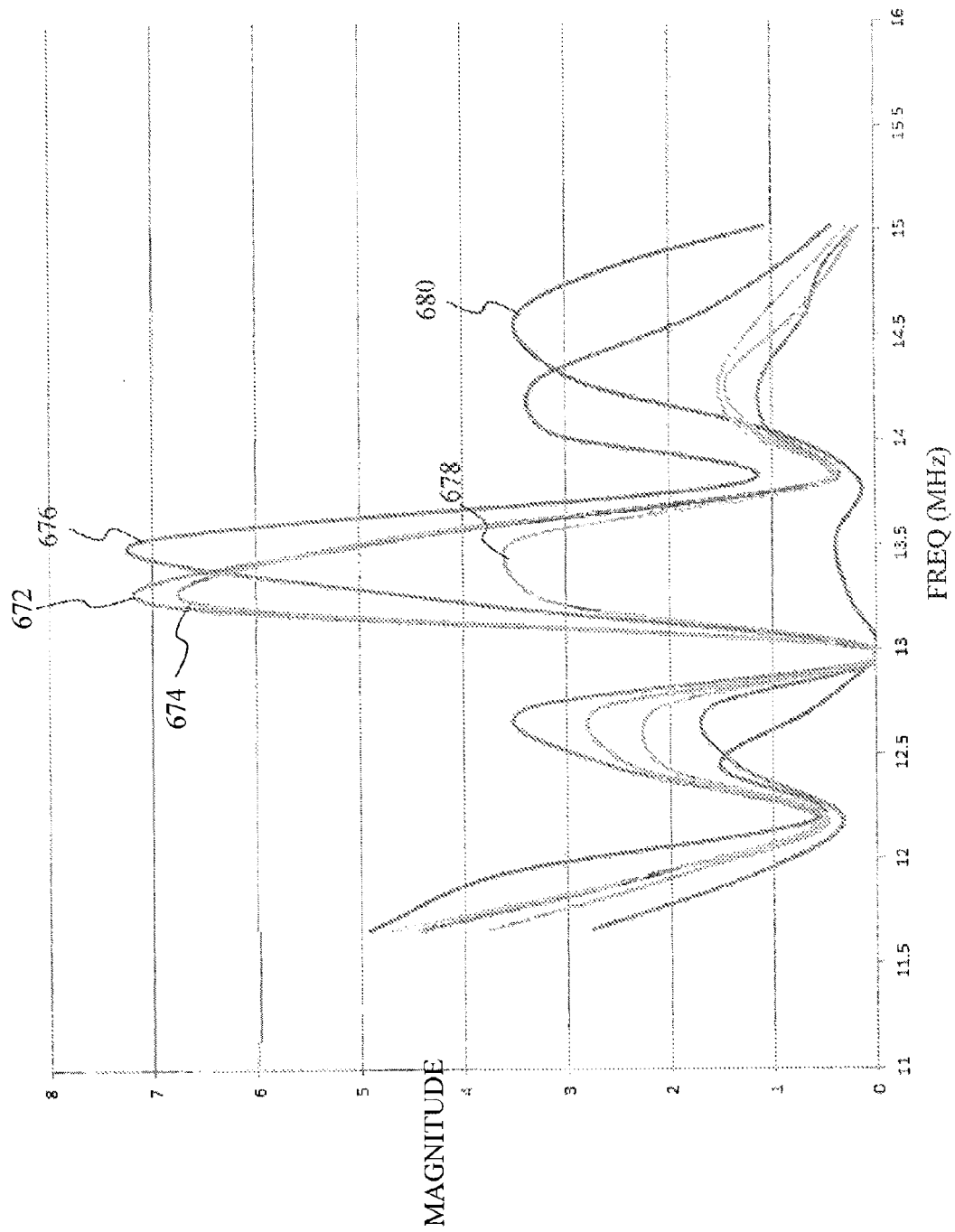
Figure 7:
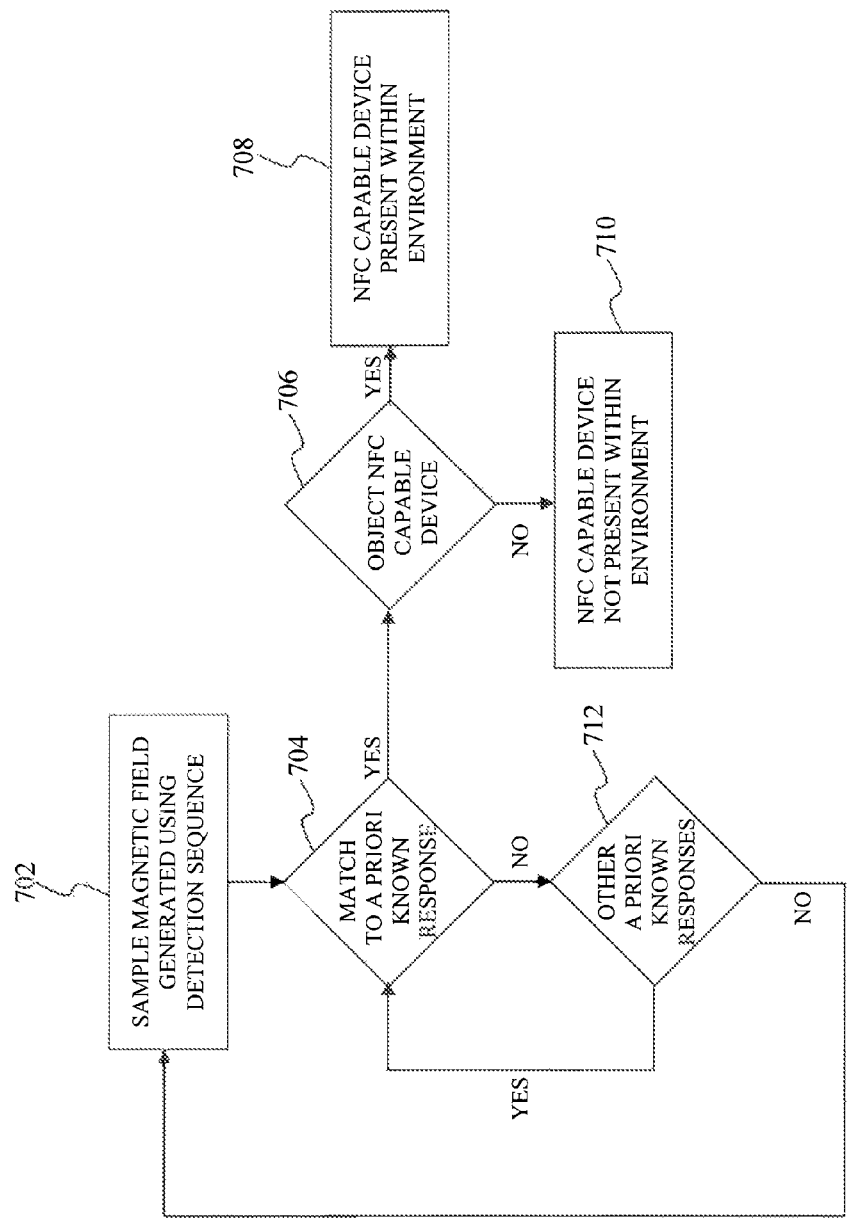
Figure 8:
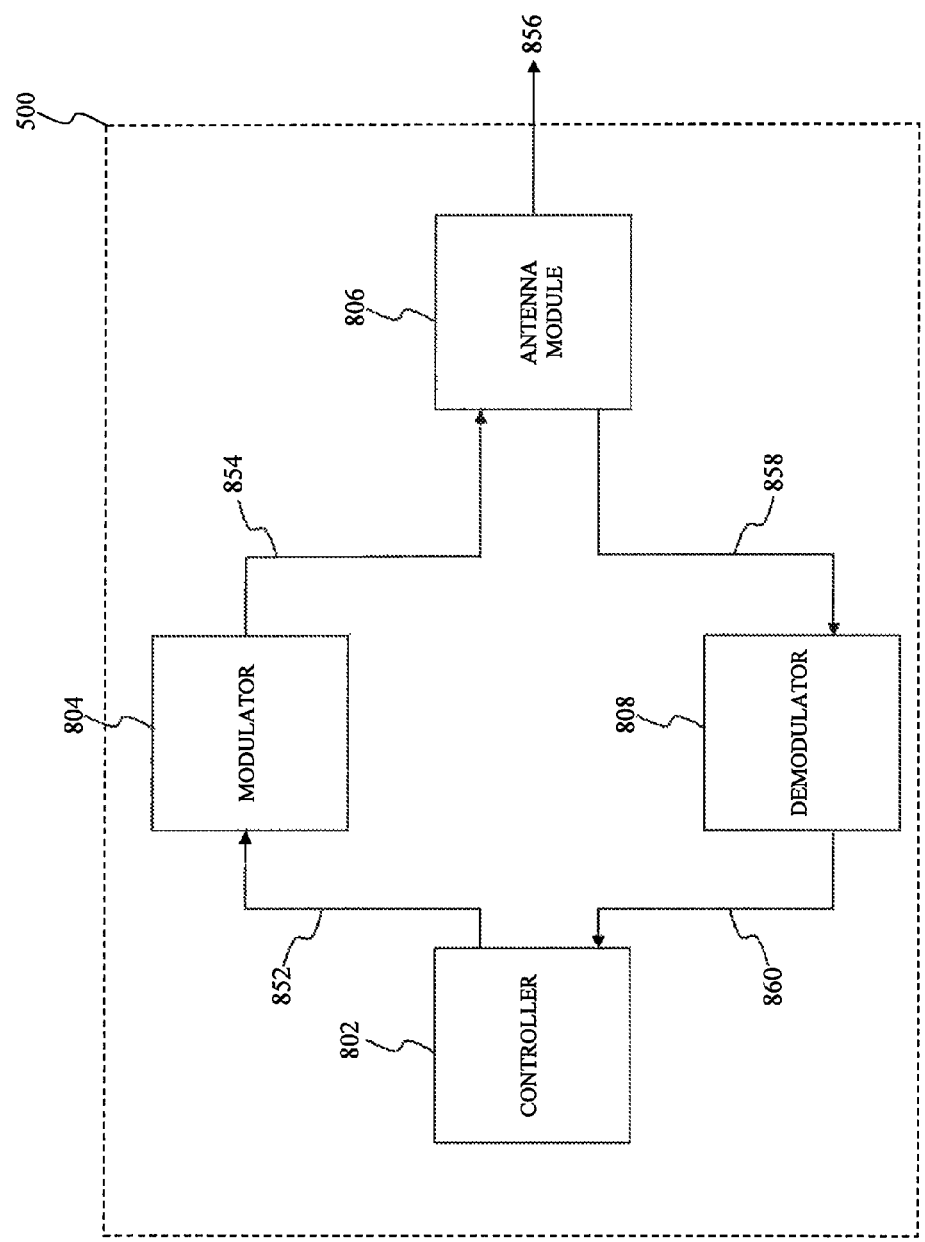

FIG. 3A graphically illustrates a first frequency detection sequence that may be used by a first NFC capable device to detect for a presence of a second NFC capable device according to an exemplary embodiment of the present disclosure;

FIG. 3B graphically illustrates a frequency domain representation of the first frequency detection sequence according to an exemplary embodiment of the present disclosure;

FIG. 4A graphically illustrates a second frequency detection sequence may be used by the first NFC capable device to detect the second NFC capable device according to an exemplary embodiment of the present disclosure;

FIG. 4B graphically illustrates a frequency domain representation of the second frequency detection sequence according to an exemplary embodiment of the present disclosure;

FIG. 5 is a flowchart of exemplary operational steps for detecting the presence of a NFC capable device within an environment according to an exemplary embodiment of the present disclosure;

FIG. 6A illustrates several a priori known responses of various objects to the frequency varying magnetic field according to an exemplary embodiment of the present disclosure;

FIG. 6B illustrates several a priori known responses of various objects to the carrier-frequency invariant magnetic field according to an exemplary embodiment of the present disclosure;

FIG. 7 is a second flowchart of exemplary operational steps for detecting the presence of a NFC capable device within an environment according to an exemplary embodiment of the present disclosure; and FIG. 8 illustrates a block diagram of a NFC device that may be used to detect a presence of other NFC capable devices according to an exemplary embodiment of the disclosure.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the i is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

For purposes of this discussion, the term "module" shall be understood to include at least one of software, firmware, and hardware (such as one or more circuits, microchips, or devices, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

Although, the present disclosure is to be described in terms of NFC, those skilled in the relevant art(s) will recognize that the present disclosure may be applicable to other communications that use the near field and/or the far field without departing from the spirit and scope of the present disclosure. For example, although the present disclosure is to be described using NFC capable communication devices, those skilled in the relevant art(s) will recognize that functions of these NFC capable communication devices may be applicable to other communications devices that use the near field and/or the far field without departing from the spirit and scope of the present disclosure.

An Exemplary Near Field Communications Environment

Figure 1:
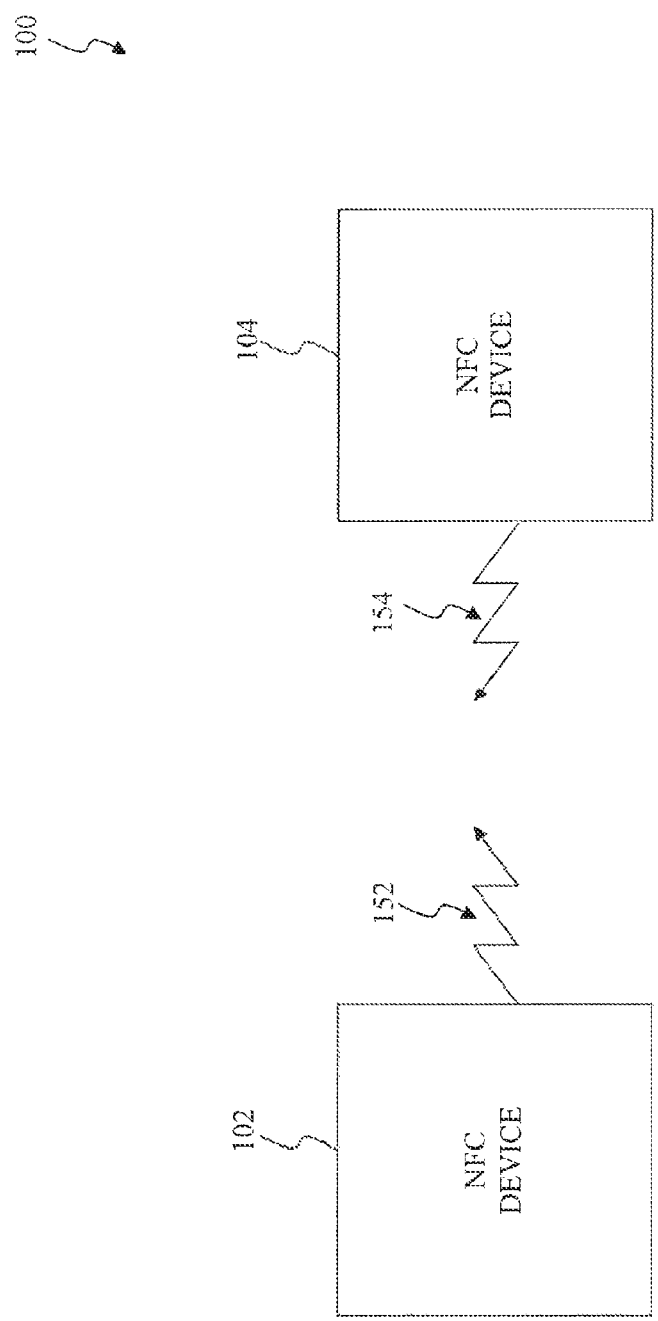
FIG. 1 illustrates a block diagram of a NFC environment according to an exemplary embodiment of the disclosure.

FIG. 1 illustrates a block diagram of a NFC environment according to an exemplary embodiment of the disclosure. A NFC environment 100 provides wireless communication of information, such as one or more commands and/or data, among a first NFC device 102 and a second NFC device 104 that are sufficiently proximate to each other. The first NFC device 102 and/or the second NFC device 104 may be implemented as a standalone or a discrete device or may be incorporated within or coupled to another electrical device or host device such as a mobile telephone, a portable computing device, another computing device such as a personal, a laptop, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the disclosure.

The first NFC device 102 detects a presence of the second NFC device 104 to enable communication of the information between the first NFC device 102 and the second NFC device 104. Typically, the first NFC device 102 observes its magnetic field for the presence of the second NFC device 104. The first NFC device 102 observes its magnetic field to determine whether the second NFC device 104 is present within its environment. Upon detecting the presence of the second NFC capable device 104 within its environment, the first NFC capable device 102 may enter into a polling mode, such as the conventional polling mode of operation 208 or any other suitable polling mode that will be apparent to those skilled in the relevant art(s) without departing from the spirit and scope of the present disclosure, to establish communication with the second NFC capable device.

Conventional Detection Mode of Operation

Conventionally, a first conventional NFC device operates in a conventional detection mode of operation to detect the presence of a second conventional NEC device. The first conventional NFC enters into a conventional polling mode of operation to establish communication with the second conventional NFC device upon detection of the second conventional NFC device.

Figure 2:
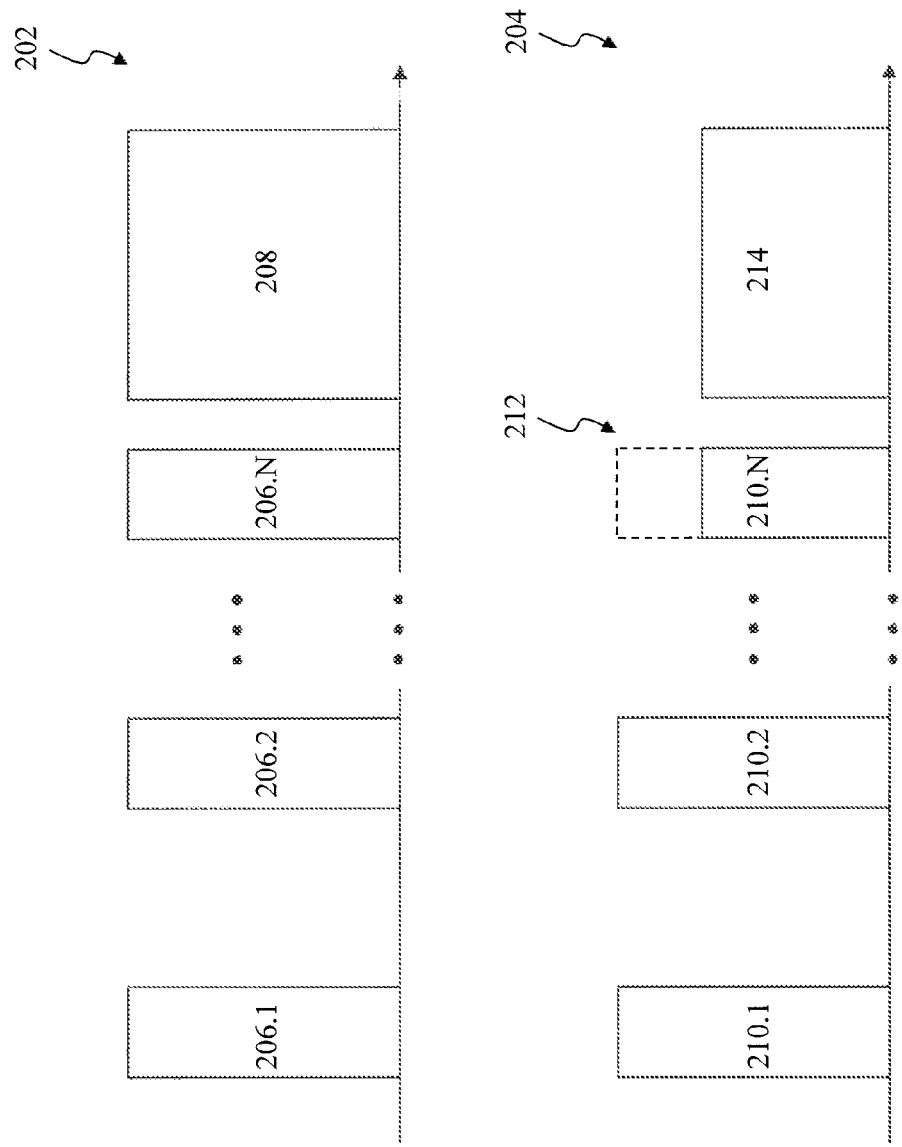
FIG. 2 illustrates a conventional detection mode of operation used by a first conventional NFC device to detect a presence of a second conventional NFC device.

FIG. 2 illustrates a conventional detection mode of operation used by a first conventional NFC device to detect a presence of a second conventional NFC device. A first conventional NFC device provides conventional detection pulses having substantially similar magnitudes until a change in the magnitude one of the conventional detection pulses is detected. This change in the magnitude indicates a second conventional NFC device has entered into a magnetic field provided by the first conventional NFC device. Upon detection of the second conventional NFC device, the first conventional NFC enters into a conventional polling mode of operation to establish communication with the second conventional NFC device.

As illustrated by a graphical illustration 202, the first conventional NFC device provides one or more conventional detection pulses 206.1 through 206.N, each of the conventional detection pulses 206.1 through 206.N being characterized as having a substantially similar magnitude. For example, a magnitude of the conventional detection pulse 206.1 is substantially similar to a magnitude of the conventional detection pulse 206.2 which is substantially similar to a magnitude of the conventional detection pulse 206.N. As additionally illustrated by the graphical illustration 202, the first conventional NFC device enters into a conventional polling mode of operation 208 following the conventional detection pulse 206.N to establish communication with the second conventional NFC device. One example of the conventional polling mode of operation 208 is described in "NFC Forum: NFC Activity Specification: Technical Specification, NFC Forum™ Activity 1.0 NFCForum-TS-Activity-1.0," published Nov. 18, 2010, which is incorporated by reference herein in its entirety.

As illustrated by a graphical illustration 204, the first conventional NFC device observes the one or more conventional detection pulses 206.1 through 206.N, referred to as one or more observed detection pulses 210.1 through 210.N. The one or more observed detection pulses 210.1 through 210.(N−1) are characterized as having substantially similar magnitudes. The substantially similar magnitudes of the one or more observed detection pulses 210.1 through 210.(N−1) indicate that the second conventional NFC device is not present within the magnetic field. As additionally illustrated by the graphical illustration 204, a magnitude of the observed detection pulse 210.N is not substantially similar to the magnitude of the observed detection pulse 210.(N−1). This difference in magnitudes indicates that the second conventional NFC device has entered into the magnetic field during the conventional detection pulse 206.N. Accordingly, the first conventional NFC device may enter into the conventional polling mode of operation 208 to establish communication with the second conventional NEC device. The first conventional NFC device continues to observe the conventional polling mode of operation 208, referred to as an observed polling mode of operation 212, to verify that the second conventional NFC device remains present within the magnetic field. The conventional detection mode of operation is further described in U.S. patent application Ser. No. 12/446,591, filed on Apr. 22, 2009 under 35 U.S.C. §371(c), which is incorporated herein by reference in its entirety.

However, this simple detection of changes of the conventional detection mode is susceptible to changes in environment. For example, moving the first conventional NFC device around the environment may cause the magnitudes of the one or more conventional detection pulses 206.1 through 206.N to change. As another example, objects within the environment, such as metal objects or other non-NFC capable devices to provide some examples, entering into the magnetic field may cause the magnitudes of the one or more conventional detection pulses 206.1 through 206.N to change. However, these changes result from changes in the environment, not from the second conventional NFC becoming present within the magnetic field. Consequentially, the first conventional NFC device may improperly determine that the second conventional NFC device is present within the magnetic field and enter into the conventional polling mode of operation 208 when the second conventional NFC device is not present within the magnetic field.

Exemplary Detection Mode of Operation

The present disclosure generates various magnetic fields to detect for NFC capable devices or other objects within its environment. As to be discussed in FIG. 3A through FIG. 3B, the present disclosure may utilize a frequency varying magnetic field to detect for NFC capable devices or other objects within the environment. As to be discussed in FIG. 4A through FIG. 4B, the present disclosure may utilize a carrier-frequency invariant magnetic field to detect for NFC capable devices or other objects within the environment. The present disclosure measures the frequency varying magnetic field and/or the carrier-frequency invariant magnetic field to detect for the NFC capable devices or the other objects within its environment.

Frequency Varying Magnetic Field

FIG. 3A graphically illustrates a first frequency detection sequence that may be used by a first NFC capable device to detect for a presence of a second NFC capable device according to an exemplary embodiment of the present disclosure. Typically, a first NFC capable device, such as the first NFC device 102 to provide an example, is configured to operate in an initiator, or a reader, mode of operation and a second NFC capable device, such as the second NFC device 104 to provide an example, is configured to operate in a target, or a tag, mode of operation.

The first NFC capable device may use a detection sequence 300 to generate a frequency varying magnetic field to sequentially probe the environment at various frequencies to detect for the presence of the second NFC capable device, as well as other objects and/or other non-NFC capable devices. Specifically, the first NFC capable device applies detection signals 302.1 through 302.N in a sequential, or near sequential, manner to its inductive coupling element to generate a frequency varying magnetic field. Typically, the first NFC capable device applies carrier waves of varying frequency for various durations to its inductive coupling element to generate the frequency varying magnetic field. For example, the first NFC capable device applies a first detection signal 302.1 that includes a first carrier wave that is characterized by a first frequency $f_1$ for a first duration of $\tau_1$ to its inductive coupling element to generate a first magnetic field. Next, the first NFC capable device applies a second detection signal 302.2 that includes a second carrier wave that is characterized by a second frequency $f_2$ for a second duration of $\tau_2$ to its inductive coupling element to generate a second magnetic field. The first NFC capable device continues in a substantially similar manner until all of the detection signals 302.1 through 302.N of the detection sequence 300 have been applied to its inductive coupling element to provide to generate the frequency varying magnetic field.

The detection signals 302.1 through 302.N may be characterized as pulses, or bursts, of energy at frequencies $f_1$ through $f_N$ for durations $\tau_1$ through $\tau_N$. Collectively, the frequencies $f_1$ through $f_N$ represent any series or sequence of frequencies that may be used to perform a sequential, or near sequential, frequency sweep of a range of frequencies, such as from approximately 12.0 to approximately 14.5 MHz or from approximately 11.0 to approximately 15.0 MHz to provide some examples, over a varying magnetic frequency field. The durations $\tau_1$ through $\tau_N$ represent sufficient durations of time to allow the second NFC capable device, when present, to cause perturbations within the frequency varying magnetic field. Typically, these perturbations may be caused by the second capable NFC device harvesting or deriving power from the frequency varying magnetic field when present. Additionally, the duration $\tau_1$ through $\tau_N$ may be of sufficient duration to allow the first NFC capable device to detect for perturbations within the frequency varying magnetic field that may indicate the presence or absence of the second NFC capable device.

FIG. 3B graphically illustrates a frequency domain representation of the first frequency detection sequence according to an exemplary embodiment of the present disclosure. A detection sequence 304 may be used to sequentially probe the environment at frequencies $F_1$ through $F_3$ to detect for the presence of the second NFC capable device, as well as other objects and/or other non-NFC capable devices, within the environment. The detection sequence 304 includes detection signals 306.1 through 306.3. However this is for illustrative purposes only, those skilled in the relevant art(s) will recognize that the detection signals 306.1 through 306.3 may include any suitable number of detection signals to perform a sequential, or near sequential, frequency sweep of a range of frequencies to detect for the presence of the second NFC capable device, as well as other objects and/or other non-NFC capable devices, over a frequency varying magnetic field without departing from the spirit and scope of the present disclosure. The detection sequence 304 may represent an exemplary frequency domain representation of the detection sequence 300.

The first NFC capable device uses the detection sequence 304 to perform a sequential, or near sequential, frequency sweep of a range of frequencies to detect for the presence of the second NFC capable device, as well as other objects and/or other non-NFC capable devices, over a frequency varying magnetic field. The first NFC capable device may apply the detection signal 306.1 to its inductive coupling element to generate a first magnetic field that is characterized by a first frequency $F_1$. Afterwards, the first NFC capable device may apply the detection signal 306.2 to its inductive coupling element to generate a second magnetic field that is characterized by a second frequency $F_2$. Next, the first NFC capable device may apply the detection signal 306.3 to its inductive coupling element to generate a third magnetic field that is characterized by a third frequency $F_3$ Collectively, the first through third magnetic fields are referred to as a frequency varying magnetic field.

Carrier-Frequency Invariant Magnetic Field

FIG. 4A graphically illustrates a second frequency detection sequence may be used by the first NFC capable device to detect the second NFC capable device according to an exemplary embodiment of the present disclosure. The first NFC capable device may use a detection sequence 400 to generate a carrier-frequency invariant magnetic field to simultaneously probe the environment at various frequencies to detect for the presence of the second NFC capable device, as well as other objects and/or other non-NFC capable devices. Specifically, the first NFC capable device applies a detection signal 402.1 to its inductive coupling element to generate a carrier-frequency invariant magnetic field. Alternatively, the first NFC capable device may apply one or more detection signals 402.1 through 402.n in a sequential, or near sequential, manner to its inductive coupling element to generate the carrier-frequency invariant magnetic field. The first NFC capable device modulates one or more periods of an electrical signal, such as a rectangular pulse 404 to provide an example, with a carrier wave 406 that is characterized by a frequency f to generate the detection signals 402.1 through 402.n. The first NFC capable device then applies the detection signals 402.1 through 402.n to its inductive coupling element to generate the carrier-frequency invariant magnetic field. The modulation of the electrical signal with the carrier wave 406 may cause frequencies, or groups of frequencies, commonly referred to as sidebands, that are lesser than and/or greater the frequency f, which contain energy to be present within the detection sequence 400.

FIG. 4B graphically illustrates a frequency domain representation of the second frequency detection sequence according to an exemplary embodiment of the present disclosure. A detection sequence 406 may be used to simultaneously probe the environment at various frequencies using a carrier-frequency invariant magnetic field to detect for the presence of the second NFC capable device, or as well as other objects and/or other non-NFC capable devices, within the environment. The detection sequence 406 may represent an exemplary frequency domain representation of the detection sequence 400.

As shown in FIG. 4B, a rectangular pulse, such as the rectangular pulse 404 to provide an example, is modulated with a carrier wave, such as the carrier wave 406 to provide an example, to generate a modulated rectangular pulse. The modulated rectangular pulse may be illustrated by a spectral component 408 that is characterized by a frequency $F_1$ and spectral components 410.1 through 410.n that are characterized by frequencies $F_{s,1}$ through $F_{s,n}$. The spectral components 410.1 through 410.n as shown in FIG. 4B are for illustrative purposes only, those skilled in the relevant art(s) will recognize that other spectral components are possible without departing from the spirit and scope of the present disclosure. The detection sequence 406 may be used to simultaneously probe the environment at the frequency $F_1$ and the frequencies $F_{s,1}$ through $F_{s,n}$ to detect for the presence of the second NFC capable device, as well as other objects and/or other non-NFC capable devices, within the environment.

The spectral components 410.1 through 410.n may be selectively determined by adjusting certain characteristics of the rectangular pulse. For example, a duty cycle of the rectangular pulse, namely a ratio between a duration and a period of the rectangular pulse, may be selectively chosen to determine a frequency separation of the spectral components 410.1 through 410.n. A larger duty cycle typically exhibits less frequency separation in frequency between the spectral components 410.1 through 410.n when compared to a smaller duty cycle. In an exemplary embodiment, the rectangular pulse 404 typically has a duty cycle of one third.

As another example, a shape of rectangular pulse may be chosen to substantially attenuate some of the frequencies $F_{s,1}$ through $F_{s,n}$. The rectangular pulse may be chosen to represent an even function to attenuate odd spectral components of the rectangular pulse. The rectangular pulse may be chosen to represent an odd function to attenuate even spectral components of the rectangular pulse. In the exemplary embodiment of the detection sequence 406 as shown in FIG. 4B, the rectangular pulse 404 represents the odd function whose even spectral components from among the spectral components 410.1 through 410.n have been attenuated.

Using the Frequency Varying Magnetic Field and/or the Carrier-Frequency Invariant Magnetic Field in the Exemplary Detection Mode of Operation FIG. 5 is a flowchart of exemplary operational steps for detecting the presence of a NFC capable device within an environment according to an exemplary embodiment of the present disclosure. The disclosure is not limited to this operational description. Rather, it will be apparent to persons skilled in the relevant art(s) from the teachings herein that other operational control flows are within the scope and spirit of the present disclosure. The following discussion describes the steps in FIG. 5.

At step 502, the operational control flow polls the environment for the presence of an NFC capable device. The operational control flow polls the environment for one possible technology type for the NEC capable device from among multiple possible technology types for NFC capable devices. The multiple possible technology types may include a type A NFC capable device, a type B NFC capable device, a type F NFC capable device, or any other type of NFC capable device that will be apparent to those skilled in the relevant art(s) without departing from the spirit and scope of the present disclosure. The operational control flow polls the environment for the type A NFC capable device using a request command, type A (REQA), the type B NFC capable device using a request command, type B (REQB), the type F NFC capable device using a request command, type F (REQF), or any other type of NFC capable device using any suitable request command that will be apparent to those skilled in the relevant art(s) without departing from the spirit and scope of the present disclosure.

At step 504, the operational control flow determines whether the NFC capable device is present within the environment. The operational control flow listens for a response from the NFC capable device, to the request command of the polling procedure of step 502. When the operational control flow receives the response, then the NFC capable device is present within the environment. In this situation, the operational control flow proceeds to step 506. Otherwise, the operational control flow does not receive the response. In this situation, the technology type NFC capable, device polled for in step 502 is not present within the environment. The operational control flow proceeds to step 508.

At step 506, the operational control flow proceeds to communicate with the NFC capable device that is present within the environment.

At step 508, the operational control flow determines whether the environment has been polled for all of the multiple possible technology types of NFC capable devices. If not, then the operational control flow reverts to step 502 to poll the environment for another possible technology type of NFC capable device from among the multiple possible technology types of NFC capable devices. Otherwise, no NFC capable device is present within the environment. In this situation, the operational control flow proceeds to step 508 to begin a detection procedure to detect for the presence of the NFC capable device.

At step 510, the operational control flow uses a detection sequence, such as the detection sequence 300, the detection sequence 304, the detection sequence 400, and/or the detection sequence 406 to provide some examples, to generate a magnetic field to detect for the presence of the NFC capable device. The operational control flow may use an unmodulated frequency varying detection sequence, such as the detection sequence 300, and/or the detection sequence 304 to provide some examples, to generate a frequency varying magnetic field to perform a sequential, or near sequential, frequency sweep of a range of frequencies to detect for the presence of the NFC capable device, as well as other objects and/or other non-NFC capable devices, within the environment. Alternatively, the operational control flow may use a modulated frequency invariant detection sequence, such as the detection sequence 400, and/or the detection sequence 404 to provide some examples, to generate a carrier-frequency invariant magnetic field to simultaneously probe the environment at various frequencies to detect for the presence of the NFC capable device, as well as other objects and/or other non-NFC capable devices, within the environment. As another alternate, the operational control flow may use any combination of the unmodulated frequency varying detection sequence and the modulated frequency invariant detection sequence to detect for the presence of the NFC capable device, as well as other objects and/or other non-NFC capable devices, within the environment.

At step 512, the operational control flow determines whether the NFC capable device is present within the environment. Specifically, the operational control flow samples the frequency varying magnetic field and/or the carrier-frequency invariant magnetic field. The operational control flow compares one or more samples of the frequency varying magnetic field and/or the carrier-frequency invariant magnetic field with one or more samples of a priori known responses of various objects, examples of which are to be discussed below in FIG. 6A and FIG. 6B, that may be present within the environment. For example, these various objects may include NFC capable devices, such as type A NFC capable devices, type B NFC capable devices, type F NFC capable devices, or any other type of NFC capable devices to provide some examples, and/or other objects, such as a metallic object to provide an example, or other non-NFC capable devices. The operational control flow uses this comparison to determine whether the NFC capable device, or other objects and/or other non-NFC capable devices, may be present within the environment. If the NFC capable device is present within the environment, then the operational control flow reverts to step 502 to poll the environment for the NFC capable device. Otherwise, the NFC capable device is not present within the environment. In this situation, the operational control flow reverts to step 510 to use another detection sequence to generate another magnetic field to detect for the presence of the NFC capable device.

A Priori Known Responses of Various Objects to the Frequency Varying Magnetic Field FIG. 6A illustrates several a priori known responses of various objects to the frequency varying magnetic field according to an exemplary embodiment of the present disclosure. Several a priori known responses for free-space 652, a small metallic object 654, a large metallic object 656, a second NFC capable device 658, and a second NFC capable device 660 are illustrated in FIG. 6A. The various a priori known responses of the various objects are for illustrative purposes only, those skilled in the relevant art(s) will recognize that other a priori known responses for the various objects described in FIG. 6A may be possible and/or other a priori known responses for other objects may be possible without departing from the spirit and scope of the present disclosure.

The free-space 652 represents a priori known response of a NFC capable device, such as the first NFC capable device 102 to provide an example, when no objects are placed within the frequency varying magnetic field. Typically, a peak response of the first NFC capable device occurs at approximately 13 MHz when no objects are placed within its magnetic field.

The small metallic object 654 represents a priori known response of the NFC capable device, when a small metallic object, such as a metallic key ring to provide an example, is placed within the frequency varying magnetic field. The priori known response of the NFC capable device to the small metallic object 654 is typically characterized as having its peak response at an approximately similar frequency as that of the free-space 652; however, this response is attenuated when compared to that of the free-space 652.

The large metallic object 656 represents a priori known response of the NFC capable device when a large metallic object, such as a metallic tray to provide an example, is placed within the frequency varying magnetic field. The priori known response of the NFC capable device to the large metallic object 656 is typically characterized as having its peak response at a different frequency as that of the free-space 652 when the large metallic object 656 is placed within the frequency varying magnetic field and/or is attenuated when compared to that of the free-space 652.

The second NFC capable device 658 represents a priori known response of the NFC capable device when a second NFC capable device that operates in accordance with a Type A technology, a Type B technology, or any other similar technology that will be apparent to those skilled in the relevant art(s) without departing from the spirit and scope of the present disclosure is placed within the frequency varying magnetic field. The priori known response of the second NFC capable device 658 to the second NFC capable device is typically characterized as having its peak response at a different frequency as that of the free-space 652 and/or is attenuated when compared to that of the free-space 652.

The second NFC capable device 660 represents a priori known response of the NFC capable device when a second NFC device that operates in accordance with Type F (FeliCa) technology or any other similar technology that will be apparent to those skilled in the relevant art(s) without departing from the spirit and scope of the present disclosure is placed within the frequency varying magnetic field. Typically, the second NFC device causes a very distinctive response as it is tuned very close to a frequency, or range of frequencies, corresponding to a peak response of the first NFC capable device. In this example, the second NFC capable device 660 is characterized as being overcoupled which reduces current in the first NFC device at this frequency, or this range of frequencies. The priori known response of the NFC capable device to the second NFC capable device 660 is typically characterized as having its peak response at a different frequency as that of the free-space 652 and/or is attenuated when compared to that of the free-space 652.

A Priori Known Responses of Various Objects to the Carrier-Frequency Invariant Magnetic Field FIG. 6B illustrates several a priori known responses of various objects to the carrier-frequency invariant magnetic field according to an exemplary embodiment of the present disclosure. Several a priori known responses for free-space 672, a small metallic object 674, a large metallic object 676, a second NFC capable device 678, and a second NFC capable device 680 are illustrated in FIG. 6B. The various a priori known responses of the various objects are for illustrative purposes only, those skilled in the relevant art(s) will recognize that other a priori known responses for the various objects described in FIG. 6B may be possible and/or other a priori known responses for other objects may be possible without departing from the spirit and scope of the present disclosure.

The free-space 672 represents a priori known response of a NFC capable device, such as the first NFC capable device 102 to provide an example, when no objects are placed within the carrier-frequency invariant magnetic field. Typically, a peak response of the first NFC capable device occurs at approximately 16.56 MHz when no objects are placed within its magnetic field. However, this example is not limiting, other frequencies are possible that will be apparent to those skilled in the relevant art(s) without departing from the spirit and scope of the present disclosure.

The small metallic object 674 represents a priori known response of the NFC capable device, when a small metallic object, such as a metallic key ring to provide an example, is placed within the carrier-frequency invariant magnetic field. The priori known response of the NFC capable device to the small metallic object 674 is typically characterized as having its peak response at an approximately similar frequency as that of the free-space 672; however, this response is attenuated when compared to that of the free-space 672.

The large metallic object 676 represents a priori known response of the NFC capable device when a large metallic object, such as a metallic tray to provide an example, is placed within the carrier-frequency invariant magnetic field. The priori known response of the NFC capable device to the large metallic object 676 is typically characterized as having its peak response at a different frequency as that of the free-space 672 when the large metallic object 676 is placed within the carrier-frequency invariant magnetic field and/or is attenuated when compared to that of the free-space 672.

The second NFC capable device 678 represents a priori known response of the NFC capable device when a second NFC capable device that operates in accordance with a Type A technology, a Type B technology, or any other similar technology that will be apparent to those skilled in the relevant art(s) without departing from the spirit and scope of the present disclosure is placed within the carrier-frequency invariant magnetic field. The priori known response of the NFC capable device to the second NFC capable device 678 is typically characterized as having its peak response at a different frequency as that of the free-space 672 and/or is attenuated when compared to that of the free-space 672.

The second NFC capable device 680 represents a priori known response of the NFC capable device when a second NFC device that operates in accordance with Type F (FeliCa) technology or any other similar technology that will be apparent to those skilled in the relevant art(s) without departing from the spirit and scope of the present disclosure is placed within the carrier-frequency invariant magnetic field. The priori known response of the NFC capable device to the second NFC capable device 680 is typically characterized as having its peak response at a different frequency as that of the free-space 672 and/or is attenuated when compared to that of the free-space 672.

Determining Whether the NFC Capable Device is Present in the Exemplary Detection Mode of Operation Generally, a first NFC capable device, such as the first NFC capable device 102 to provide an example, samples a frequency varying magnetic field that is produced in response to a frequency varying detection sequence, such as the detection sequence 300 and/or the detection sequence 304 to provide some examples, and/or a carrier-frequency invariant magnetic field that is produced in response to a frequency invariant detection sequence, such as the detection sequence 400, and/or the detection sequence 406 to provide some examples. The first NFC capable device compares, in either the time domain or the frequency domain, the samples of the frequency varying magnetic field and/or the carrier-frequency invariant magnetic field with corresponding samples from various priori known responses of various objects to detect the presence of a second NFC capable device, such as the second NFC capable device 104 to provide an example, as well as other objects and/or other non-NFC capable devices within the environment. Typically, the first NFC capable device determines one of the various objects is present when the a priori known response corresponding to one of the various objects substantially matches the samples of the frequency varying magnetic field and/or the carrier-frequency invariant magnetic field. The a priori known response of that object may be approximately equal to the samples of the frequency varying magnetic field and/or the carrier-frequency invariant magnetic field and/or differ from the samples of the frequency varying magnetic field and/or the carrier-frequency invariant magnetic field by a threshold amount to be considered substantially matched.

FIG. 7 is a second flowchart of exemplary operational steps for detecting the presence of a NFC capable device within an environment according to an exemplary embodiment of the present disclosure. The second flowchart as shown in FIG. 7 further illustrates an exemplary embodiment of step 512 as discussed in FIG. 5. The disclosure is not limited to this operational description. Rather, it will be apparent to persons skilled in the relevant art(s) from the teachings herein that other operational control flows are within the scope and spirit of the present disclosure. The following discussion describes the steps in FIG. 7.

At step 702, the operational control flow samples a magnetic field produced by a detection sequence, such as the detection sequence 300, the detection sequence 304, the detection sequence 400, and/or the detection sequence 406 to provide some examples. The operational control flow may provide one or more samples of a frequency varying magnetic field produced in response to a unmodulated frequency varying detection sequence, such as the detection sequence 300, and/or the detection sequence 304 to provide some examples, and/or a carrier-frequency invariant magnetic field produced in response to a modulated frequency invariant detection sequence, such as the detection sequence 400 and/or the detection sequence 406 to provide some examples. The operational control flow may, optionally, perform a fast Fourier transform (FFT) and/or a discrete Fourier transform (DFT) upon the one or more samples to translate the one or more samples from a representation in the time domain representation to a representation in the frequency domain.

At step 704, the operational control flow determines whether the one or more samples from step 702 substantially match one or more samples of an a priori known response to corresponds to an object that may be present within the environment. Typically, the a priori known response of step 704 represents an a priori known response that is selected from among multiple a priori known responses that correspond to various objects that may be present within the environment. Specifically, the operational control flow determines whether one or more magnitudes of the one or more samples from step 702 substantially match one or more magnitudes of one or more samples of the a priori known response at one or more frequencies in either the time domain or the frequency domain. The one or more samples from step 702 and the one or more samples of the a priori known response substantially match when the one or more samples from step 702 are approximately equal to the one or more samples of the a priori known response and/or differ by a threshold amount. Optionally, the operational control flow may further process the one or more samples at step 702 before the comparison. For example, the operational control flow may determine a maximum magnitude and/or its associated frequency of the one or more samples from step 702 and determine whether the maximum magnitude and/or its associated frequency magnitude substantially match a frequency and/or a maximum magnitude of the a priori known response. The operational control flow proceeds to step 706 when the one or more samples from step 702 substantially match the one or more samples of the a priori known response. Otherwise, the operational control flow proceeds to step 712 when the one or more samples from step 702 are not substantially matched to the one or more samples of the a priori known response At step 706, the operational control flow characterizes the object present within the environment that is characterized as having the a priori known response that substantially matched the one or more samples from step 702. The priori known response that substantially matched may correspond to no object, such as free-space, being present within the environment, another NFC capable device being present within the environment, other non-NFC capable devices being present within the environment, or other objects, such as metallic objects, being present within the environment. The operational control flow proceeds to step 708 when the operational control flow characterizes the object that is present within the environment as being a NFC capable device. Otherwise, the operational control flow proceeds to step 710 when no NFC capable devices are present within the environment.

At step 708, the operational control flow determines that the NFC capable device is present within the environment. The operational control flow may, optionally, characterize a technology type, of the NFC capable device that is present within the environment. It should be noted that the operational control flow, as discussed in FIG. 5, may poll for the technology type of the NFC capable device or alternatively, all possible technology types upon determining that the NFC capable device is present within the environment. In addition, the order that the polling is carried out can be determined such that the technology with priori known response which matches the maximum magnitude and/or its associated frequency magnitude of the sample closest, is polled first.

At step 710, the operational control flow determines that no NFC capable devices are present within the environment. The operational control flow may, optionally, characterized the object that is present within the environment as being a non-NFC capable device, another object, such a metallic object, or no object at all.

At step 712, the operational control flow selects another a priori known response for another object that may be present within the environment. The operational control flow reverts to step 704 to select another a priori known response from among the multiple a priori known responses that corresponds to another object that may be present within the environment. The operational control flow repeats step 704 and step 712 until an object is detected within the environment or all of the multiple a priori known responses have been compared at which the operational control flow reverts back to step 702.

A First Exemplary NFC Device

FIG. 8 illustrates a block diagram of a NFC device that may be used to detect a presence of other NFC capable devices according to an exemplary embodiment of the disclosure. A NFC device 800 may be configurable to operate in a detection mode of operation to detect a presence of another NFC capable device within in its environment. It should be noted that FIG. 8 illustrates only the detection mode of operation, those skilled in the relevant art(s) will recognize that the NFC device 800 may be configured to operate in other modes of operation, such as a peer (P2P) communication mode or a reader/writer (R/W) communication mode to provide some examples, without departing from the spirit and scope of the present disclosure. The NFC device 800 includes a controller module 802, a modulator module 804, an antenna module 806, and a demodulator module 808. The NFC device 800 may represent an exemplary embodiment of the first NFC device 102.

The controller module 802 controls overall operation and/or configuration of the NFC device 800. The controller module 802 generates a detection sequence 852, such an envelope of the detection sequence 300, the detection sequence 304, the detection sequence 400, and/or the detection sequence 406 to provide some examples, in the detection mode of operation.

The controller module 802 may generate the detection sequence 852 in response to a command. The command may be provided to the controller module 802 from one or more data storage devices such as one or more contactless transponders, one or more contactless tags, one or more contactless smartcards, any other machine-readable mediums that will be apparent to those skilled in the relevant art(s) without departing from the spirit and scope of the disclosure, or any combination thereof. The other machine-readable medium may include, but is not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples. The controller module 802 may also receive the command from a user interface such as a touchscreen display, an alphanumeric keypad, a microphone, a mouse, a speaker, any other suitable user interface that will be apparent to those skilled in the relevant art(s) without departing from the spirit and scope of the disclosure to provide some examples. The controller module 802 may further receive the command from other electrical devices or host devices coupled to the NFC device 800.

The modulator module 804 modulates the detection sequence 852 onto a carrier wave using any suitable analog or digital modulation technique to provide a modulated detection sequence 854. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). The detection sequence 852 may represent an unmodulated frequency varying detection sequence, such as the detection sequence 300, and/or the detection sequence 304 to provide some examples, and/or a modulated frequency invariant detection sequence, such as the detection sequence 400 to provide an example.

The antenna module 806 applies the modulated detection sequence 854 to an inductive coupling element, such as a resonant tuned circuit to provide an example, to generate a frequency varying magnetic field and/or a carrier-frequency invariant magnetic field to provide a detection sequence 856. The antenna module 806 observes the detection sequence 856 to provide an observed detection sequence 858.

The demodulator module 808 demodulates the observed detection sequence 858 using any suitable analog or digital modulation technique to provide a recovered detection signal 860. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

The controller module 802 samples the recovered detection signal 860 to detect the presence of a second NFC capable device, such as the second NFC capable device 104 to provide an example, as well as other objects and/or other non-NFC capable devices within the environment. The controller module 802 compares, in the time domain and/or the frequency domain, the samples of the recovered detection signal 860 with corresponding samples from various a priori known responses of various objects to detect the presence of the second NFC capable device as well as other objects and/or other non-NFC capable devices within the environment. Typically, the controller module 802 determines one of the various objects is present when the a priori known response corresponding to one of the various objects substantially matches the samples of the recovered detection signal 860. Optionally, the controller module 802 may perform a fast Fourier transform (FFT) and/or a discrete Fourier transform (DFT) upon the one or more samples of the recovered detection signal 860 to translate the one or more samples from a representation in the time domain representation to a representation in the frequency domain.

CONCLUSION

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A method for detecting a presence of a first near field communication (NFC) capable device, comprising:
    generating, by a second NFC capable device, a carrier-frequency invariant magnetic field to detect for the presence of the first NFC capable device;
    comparing the magnetic field with an a priori known response of the first NFC capable device to the carrier-frequency invariant magnetic field; and determining the first NFC capable device to be present within an environment of the second NFC capable device when the carrier-frequency invariant magnetic field substantially matches the a priori known response.

2. The method of claim 1, wherein generating comprises:
applying a detection signal to an inductive coupling element to generate the carrier-frequency invariant magnetic field, the detection signal being characterized as having more than one period of an electrical signal that is modulated with a carrier wave.

3. The method of claim 2, wherein applying comprises:
modulating a first period of the electrical signal with the carrier wave that is characterized by a first frequency to provide a first modulated period;
modulating a second period of the electrical signal with the carrier wave that is characterized by the first frequency to provide a second modulated period; and
applying the first and the second modulated periods to the inductive coupling element to generate the carrier-frequency invariant magnetic field.

4. The method of claim 1, further comprising:
sampling, by the second NFC capable device, the carrier-frequency invariant magnetic field; and
translating the samples of the carrier-frequency invariant magnetic field from a representation in a time domain to a representation in a frequency domain, and
wherein determining comprises:
comparing, in the frequency domain, the samples of the carrier-frequency invariant magnetic field with a samples of the a priori known response in the frequency domain.

5. The method of claim 1, wherein determining comprises:
determining the carrier-frequency invariant magnetic field substantially matches the a priori known response when the carrier-frequency invariant magnetic field differs from the a priori known response by a threshold amount.

6. The method of claim 1, wherein determining comprises:
determining the carrier-frequency invariant magnetic field substantially matches the a priori known response when the carrier-frequency invariant magnetic field is substantially similar to the a priori known response.

7. A method for detecting a presence of a first near field communication (NFC) capable device, comprising:
generating, by a second NFC capable device, a frequency varying magnetic field to detect for the presence of the first NFC capable device;
comparing the frequency varying magnetic field with an a priori known response of the first NFC capable device to the magnetic field; and
determining the first NFC capable device to be present within an environment of the second NFC capable device when the frequency varying magnetic field substantially matches the a priori known response.

8. The method of claim 7, wherein generating further comprises:
applying a plurality of detection signals to an inductive coupling element to generate the frequency varying magnetic field, each of the plurality of detection signals being characterized as having a different frequency from among a plurality of frequencies.

9. The method of claim 8, wherein applying comprises:
applying a first detection signal from among the plurality of detection signals that includes a first carrier wave that is characterized by a first frequency from among the plurality of frequencies for a first duration to generate a first magnetic field; and
applying a second detection signal from among the plurality of detection signals that includes a second carrier wave that is characterized by a second frequency from among the plurality of frequencies for a second duration to generate a second magnetic field,
wherein the frequency varying magnetic field includes the first magnetic field and the second magnetic field.

10. A first near field communication (NFC) capable device for detecting a presence of a second NFC capable device using a carrier-frequency in magnetic field, comprising:
a demodulator module configured to recover a detection sequence from the carrier-frequency invariant magnetic field; and
a controller module configured to compare the carrier-frequency invariant magnetic field with an a priori known response of the first NEC capable device to the carrier-frequency invariant magnetic field and to determine the second NFC capable device to be present within an environment of the first NFC capable device when the carrier-frequency invariant magnetic field substantially matches the a priori known response.

11. The first NFC device of claim 10, further comprising:
an antenna module configured to apply a detection signal to an inductive coupling element to generate the carrier-frequency invariant magnetic field, the detection signal being characterized as having more than one period of a rectangular pulse that is modulated with a carrier wave.

12. The first NFC device of claim 11, further comprising:
a modulator configured to modulate a first period of the rectangular pulse with the carrier wave to provide a first modulated period and to modulate a second period of the rectangular pulse with the carrier wave to provide a second modulated period,
wherein the antenna module is further configured to apply the first and the second modulated periods to the inductive coupling element to generate the carrier-frequency invariant magnetic field.

13. The first NFC device of claim 10, wherein the controller module is further configured to sample the carrier-frequency invariant magnetic field, to translate the samples of the carrier-frequency invariant magnetic field from a representation in a time domain to a representation in a frequency domain, and to compare, in the frequency domain, the samples of the carrier-frequency invariant magnetic field with samples of the a priori known response in the frequency domain.

14. The first NFC device of claim 10, wherein the controller module is further configured to determine the carrier-frequency invariant magnetic field substantially matches the a priori known response when the carrier-frequency invariant magnetic field differs from the a priori known response by a threshold amount.

15. The first NFC device of claim 10, wherein the controller module is further configured to determine the carrier-frequency invariant magnetic field substantially matches the a priori known response when the carrier-frequency invariant magnetic field is substantially similar to the a priori known response.

16. A first near field communication (NFC) capable device for detecting a presence of a second NFC capable device using a frequency varying magnetic field, comprising:
a demodulator module configured to recover a detection sequence from the frequency varying magnetic field; and
a controller module configured to compare the frequency varying magnetic field with an a priori known response of the first NFC capable device to the frequency varying magnetic field and to determine the second NFC capable device to be present within an environment of the first NFC capable device when the frequency varying magnetic field substantially matches the a priori known response.

17. The first NFC device of claim 16, further comprising:
an antenna module configured to apply a plurality of detection signals to an inductive coupling element to generate the frequency varying magnetic field, each of the plurality of detection signals being characterized as having a different frequency from among a plurality of frequencies.

18. The first NFC device of claim 17, wherein the antenna module is further configured to apply a first detection signal from among the plurality of detection signals that includes a first carrier wave that is characterized by a first frequency from among the plurality of frequencies for a first duration to generate a first magnetic field and to apply a second detection signal from among the plurality of detection signals that includes a second carrier wave that is characterized by a second frequency from among the plurality of frequencies for a second duration to generate a second magnetic field, and
wherein the frequency varying magnetic field includes the first magnetic field and the second magnetic field.

* * * * *

UNITED STATES PATENT AND TRADEMARK OFFICE
CERTIFICATE OF CORRECTION

PATENT NO. : 8,867,990 B2  Page 1 of 1
APPLICATION NO. : 13/408149
DATED : October 21, 2014
INVENTOR(S) : Royston et al.

It is certified that error appears in the above-identified patent and that said Letters Patent is hereby corrected as shown below:

In the claims

Column 17, lines 30-31, Claim 4 replace "with a samples" with --with samples--.
Column 18, line 16, Claim 10 replace "NEC" with --NFC--.

Signed and Sealed this
Third Day of March, 2015

Michelle K. Lee
*Deputy Director of the United States Patent and Trademark Office*